(12) United States Patent
Brothers et al.

(10) Patent No.: US 8,851,173 B2
(45) Date of Patent: Oct. 7, 2014

(54) SET-DELAYED CEMENT COMPOSITIONS COMPRISING PUMICE AND ASSOCIATED METHODS

(75) Inventors: Lance E. Brothers, Chickasha, OK (US); Thomas J. Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 342 days.

(21) Appl. No.: 13/417,001

(22) Filed: Mar. 9, 2012

(65) Prior Publication Data

US 2013/0233550 A1    Sep. 12, 2013

(51) Int. Cl.
*E21B 33/13* (2006.01)
*E21B 33/14* (2006.01)
*C09K 8/467* (2006.01)

(52) U.S. Cl.
USPC ........... 166/292; 106/792; 106/795; 166/294; 166/300; 507/235; 507/260; 507/269

(58) Field of Classification Search
None
See application file for complete search history.

(56) References Cited

U.S. PATENT DOCUMENTS

| | | | |
|---|---|---|---|
| 3,557,876 A | 1/1971 | Tragesser | |
| 3,887,009 A | 6/1975 | Miller et al. | |
| 3,959,003 A | 5/1976 | Ostroot et al. | |
| 4,462,837 A * | 7/1984 | Baker et al. | 106/720 |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A | 6/1987 | Childs | |
| 4,818,288 A | 4/1989 | Aignesberger et al. | |
| 5,058,679 A | 10/1991 | Hale et al. | |
| 5,263,542 A | 11/1993 | Brothers | |
| 5,447,197 A | 9/1995 | Rae et al. | |
| 5,547,506 A | 8/1996 | Rae et al. | |
| 6,173,778 B1 | 1/2001 | Rae et al. | |
| 6,279,655 B1 | 8/2001 | Pafitis et al. | |
| 6,457,523 B1 | 10/2002 | Vijn et al. | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,204,307 B2 | 4/2007 | Roddy et al. | |
| 7,284,611 B2 | 10/2007 | Reddy et al. | |
| 7,338,923 B2 | 3/2008 | Roddy et al. | |
| 7,478,675 B2 | 1/2009 | Roddy et al. | |
| 7,559,369 B2 | 7/2009 | Roddy et al. | |
| 7,575,055 B2 | 8/2009 | Reddy et al. | |
| 7,617,870 B1 | 11/2009 | Roddy et al. | |
| 7,631,692 B2 | 12/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,183,186 B2 | 5/2012 | Luo | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,492,317 B2 | 7/2013 | Chatterji et al. | |
| 8,505,630 B2 | 8/2013 | Chatterji et al. | |
| 8,623,794 B2 | 1/2014 | Chatterji et al. | |
| 2004/0211342 A1 | 10/2004 | Sprouts et al. | |
| 2006/0166834 A1 | 7/2006 | Roddy et al. | |
| 2009/0124522 A1 | 5/2009 | Roddy et al. | |
| 2010/0016183 A1 | 1/2010 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0095871 A1 | 4/2010 | Patil | |
| 2010/0240556 A1 | 9/2010 | Keys et al. | |
| 2010/0258312 A1 | 10/2010 | Brenneis et al. | |

(Continued)

FOREIGN PATENT DOCUMENTS

WO    9620899    7/1996

OTHER PUBLICATIONS

Benge et al., "Deep Gas-Well Cementation: A Review of Risks and Design Basis for Use of a Liquid Cement Premix for Large Offshore Cementing Operations", IADC/SPE 98970, pp. 1-5, IADC/SPE Drilling Conference, 2006.

(Continued)

*Primary Examiner* — George Suchfield

(74) *Attorney, Agent, or Firm* — Craig W. Roddy; Tumey L.L.P.

(57) ABSTRACT

A variety of methods and compositions are disclosed, including, in one embodiment, a method of cementing in a subterranean formation, comprising: providing a set-delayed cement composition comprising water, pumice, hydrated lime, and a set retarder; activating the set-delayed cement composition; introducing the set-delayed cement composition into a subterranean formation; and allowing the set-delayed cement composition to set in the subterranean formation.

21 Claims, No Drawings

(56) References Cited

U.S. PATENT DOCUMENTS

| | | |
|---|---|---|
| 2010/0273912 A1 | 10/2010 | Roddy et al. |
| 2010/0282466 A1 | 11/2010 | Brenneis et al. |
| 2011/0100626 A1 | 5/2011 | Brenneis et al. |
| 2011/0132605 A1 | 6/2011 | Sarap et al. |
| 2011/0162845 A1 | 7/2011 | Ravi et al. |
| 2012/0167803 A1 | 7/2012 | Luo |
| 2012/0186494 A1 | 7/2012 | Roddy |
| 2012/0190769 A1 | 7/2012 | Patil |
| 2012/0192768 A1 | 8/2012 | Ravi |
| 2012/0211227 A1 | 8/2012 | Thaemlitz |
| 2012/0291674 A1* | 11/2012 | Brenneis et al. ............... 106/716 |
| 2013/0248183 A1 | 9/2013 | Pisklak et al. |
| 2014/0000893 A1 | 1/2014 | Lewis et al. |
| 2014/0020895 A1 | 1/2014 | Agapiou et al. |
| 2014/0034313 A1 | 2/2014 | Pisklak et al. |
| 2014/0034314 A1 | 2/2014 | Lewis et al. |
| 2014/0048267 A1 | 2/2014 | Pisklak et al. |
| 2014/0083701 A1 | 3/2014 | Boul et al. |
| 2014/0090843 A1 | 4/2014 | Boul et al. |

OTHER PUBLICATIONS

Rae et al., "Liquid Cement Premix Introduces New Solutions to Conventional Cementing Problems", IADC/SPE 35086, pp. 393-400, IADC/SPE Drilling Conference, 1996.

Rae et al., "Liquid Cement Premix for Improved Abandonment and Workover Operations", SPE 36477, pp. 637-643, SPE, Inc., 1996.

Anderson et al., "New Technology Eliminates Bulking in Cementing Operations", SPE 36478, pp. 645-653, SPE, Inc., 1996.

Anderson et al., "New Technology Improves Cement Slurry Design", SPE 36973, pp. 127-136, SPE, Inc., 1996.

Shaefer et al., "Utilizing 'Over-Seas' Technology Improves the Cementing Processes in the DJ Basin of Colorado", SPE 80940, pp. 1-8, SPE, Inc., 2003.

"Liquid Stone® Cement Technology", Product Sales Bulletin, BJ Services Company, pp. 1-2, Oct. 19, 2004.

HES brochure "Micro Matrix® Cement Retarder", H01481, Aug. 2007.

HES brochure "CFR-3™ Cement Friction Reducer", H01325, Oct. 2005.

Hess Pumice Products, Inc., "Fact Sheet", located at website www.hesspumice.com.

"Conduction Calorimetric Investigation of the effect of Retarders on the Hydration of Portland Cement", V.S. Ramachandran and M.S. Lowery—Thermochimica Arts, 195 (1992) 373-387.

Benge, O.G. et al., "Evaluation of Blast Furnace Slag Slurried for Oilfield Application" SPE 27449, pp. 169-180, SPE, Inc., 1994.

Allahverdi, A. et al., (2006). "Chemical activation and set acceleration of lime-natural pozzolan cement." Ceramics-Silikaty, 193-199.

Brito, A. et al., (2004). "High surface area support, catalyst derived from natural pumice." Study of pretreatment variables. Ind. Eng. Chem. Res., 443, 1659-1664.

Johnson, C.D. et al., (2007). "Zeolitisation of pumice-microporous materials on macroporous support structures derived from natural minerals." J. Mat. Chem., 17, 476-484.

Mielenz, R.C. et al., (1950). "Effect of calcination on natural pozzolans." Symposium on use of pozzolanic materials in mortars and concretes (pp. 43-92). ASTM.

Ottana, R. et al., (1982). "Hydrothermal synthesis of zeolites from pumice in alkaline and saline environment." Zeolites, 2, 295-298.

Palomo, A. et al., (2011). "Alkaline activation, procedure for transforming fly ash into new materials. Part I: Applications." World of Coal Ash (WOCA) Conference (pp. 1-14). Denver, CO:http://www.flyash.info/.

Pisklak, T.J. et al., (2004). "Preparation and characterization of mordenite thin films via pulsed laser deposition." Journal of Porous Materials, 11(4), 191-209.

Rebrov, E.V. et al., (2009). "Sol-gel synthesis of zeolite coatings and their application in catalytic microstructured reactors." Catalysis in Industry, 1(4), 322-347.

Saija, L.M. et al., (1983). "Zeolitization of pumice in ash-sodium salt solutions." Mat. Chem. Phys., 8, 207-216.

Shi, C. (2001). "An overview on the activation reactivity of natural pozzolans." Can J. Civ. Eng., 778-786.

Shvarzman, A. et al., (2001). "Influence of chemical and phase composition of mineral admixtures on their pozzolanic activity." Advances in Cement Research, 13(1), 1-7.

U.S. Appl. No. 14/202,625, filed Mar. 10, 2014.
U.S. Appl. No. 14/090,573, filed Nov. 26, 2013.
U.S. Appl. No. 14/194,125, filed Feb. 28, 2014.
U.S. Appl. No. 14/221,479, filed Mar. 21, 2014.
U.S. Appl. No. 13/873,905, filed Apr. 30, 2013.
U.S. Appl. No. 14/143,497, filed Dec. 30, 2013.
U.S. Appl. No. 14/143,660, filed Dec. 30, 2013.

Ramy N. Eid, Liquid Cement: Changing the Paradigm, Society of Petroleum Engineers, Apr. 15, 2007.

"Competitive Adsorption of Phosphate and Phosphonates onto Goethite", Bernd Nowack and Alan T. Stone—Water Research 40 (2006) 2201-2209.

"Molecular Modeling of the Mechanism of Action of Phosphonate Retarders on Hydrating Cements", Peter V. Coveney and William Humphries—J. Chem. Soc., Faraday Trans., 1996, 92(5, 831-841).

Yana, Y. et al., (1996). "Growth and Engineering of Microporous Zeolite Films and Coatings." MRS Proceedings, 431, p. 211.

PCT Search Report for PCT International Application No. PCT/US2013/029489 dated Apr. 19, 2013.

PCT Written Opinion for PCT International Application No. PCT/US2013/029489 dated Apr. 19, 2013.

* cited by examiner

SET-DELAYED CEMENT COMPOSITIONS COMPRISING PUMICE AND ASSOCIATED METHODS

BACKGROUND

Cement compositions may be used in a variety of subterranean operations. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for an extended period of time (e.g., at least about 1 day to about 2 weeks or more). When desired for use, the set-delayed cement compositions should be capable of being activated whereby reasonable compressive strengths are developed. For example, a cement set accelerator may be added to a set-delayed cement composition whereby the composition sets into a hardened mass. Among other things, the set-delayed cement composition may be suitable for use in well bore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures.

SUMMARY

An embodiment of the present invention provides a method of cementing in a subterranean formation. The method may comprise providing a set-delayed cement composition comprising water, pumice, hydrated lime, and a set retarder. The method may further comprise activating the set-delayed cement composition. The method may further comprise introducing the set-delayed cement composition into a subterranean formation. The method may further comprise allowing the set-delayed cement composition to set in the subterranean formation.

Another embodiment of the present invention provides a method of cementing in a subterranean formation. The method may comprise providing a set-delayed cement composition comprising water, pumice, hydrated lime, and a set retarder. The method may further comprise storing the set-delayed cement composition for a period of at least about 1 day. The method may further comprise adding a cement set accelerator to the set-delayed cement composition. The method may further comprise introducing the set-delayed cement composition into a subterranean formation. The method may further comprise allowing the set-delayed cement composition to set in the subterranean formation.

Another embodiment of the present invention provides a set-delayed cement composition that may comprise water, pumice, hydrated lime, and a set retarder. The set-delayed cement composition may remain in a pumbable fluid state for a time period of at least about 1 day.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean cementing operations and, more particularly, in certain embodiments, to set-delayed cement compositions and methods of using set-delayed cement compositions in subterranean formations.

Embodiments of the set-delayed cement compositions of the present invention may generally comprise water, pumice, hydrated lime, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable-compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F.

The water used in embodiments of the set-delayed cement compositions of the present invention may be from any source provided that it does not contain an excess of compounds that may undesirably effect, other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments of the present invention. Further, the water may be present in an amount sufficient to form a pumpable slurry. In certain embodiments, the water may be present in the set-delayed cement composition in an amount in the range of from about 33% to about 200% by weight of the pumice. in certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties, in that it may set and harden in the presence of hydrated lime and water. The pumice may also be ground, for example. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 micron, from about 5 microns to about 100 microns, or from about 10 micron to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for use for a chosen application.

Embodiments of the set-delayed cement compositions may comprise hydrated lime. As used herein, the term "hydrated lime" will be understood to mean calcium hydroxide. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in the set-delayed cement compositions useful in the present invention. For example, the set retarder may comprise phosphonic acid, phosphonic acid derivatives, lignosulfonates, salts, organic acids, carboxymethylated hydroxyethylated celluloses, synthetic co- or terpolymers comprising sulfonate and carboxylic acid groups, borate compounds, derivatives thereof, or mixtures thereof. In certain embodiments, the set retarders used in the set-delayed cement compositions useful in the present invention are phosphonic acid derivatives, such as those described in U.S. Pat. No. 4,676,832, the disclosure of which is incorporated herein by reference. Examples of suitable set retarders include, among others, phosphonic acid derivatives available from Halliburton Energy Services, Inc., of Duncan, Okla., as Micro Matrix® cement retarder. Generally, the set retarder may be present in the set-delayed cement composition used in the present invention in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants and polycarboxylated ether dispersants. One example of a suitable sulfonated-formaldehyde-based dispersant that may be suitable is a sulfonated acetone formaldehyde condensate, available from Halliburton Energy Services, Inc., as CFR™-3 dispersant. One example of a suitable polycarboxylated ether dispersant that may be suitable is Liquiment® 514L dispersant, available from BASF Corporation, Houston, Tex., that comprises 36% by weight of the polycarboxylated ether in water. While a variety of dispersants may be used in accordance with embodiments of the present invention, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof In embodiments, one or more of these additives may be added to the set-delayed cement composition after storing but prior to placement of the set-delayed cement composition into a subterranean formation. A person having ordinary skill in the art, with the benefit of this disclosure, will readily be able to determine the type and amount of additive useful for a particular application and desired result.

Those of ordinary skill in the art will appreciate that embodiments of the set-delayed cement compositions of the present invention generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for an extended period of time. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005. As set forth in Example 4 below, an example composition was prepared that comprised pumice, 20% hydrated lime, 1.4% dispersant (Liquimen® 514L), 1.26% set retarder (Micro Matrix® cement retarder), and 62% water (all % by weight of pumice). After 45 days of storage at ambient conditions, the example composition was mixed with 6% calcium chloride by weight of the pumice. At 140° F., the example composition had a thickening time (time to 70 Bc) of 2 hours and 36 minutes and developed 50 psi compressive strength in 9 hours and 6 minutes as measured on an Ultrasonic Cement Analyzer ("UCA"), available from Fann Instrument Company, Houston, Tex., while maintained at 3000 psi. After 48 hours, the sample was crushed and had a compressive strength of 2,240 psi.

When desired for use, embodiments of the set-delayed cement compositions may be activated (e.g., by combination with a cement set accelerator) to thereby set into a hardened mass. By way of example, embodiments of the set-delayed cement compositions may be activated to set to form a hardened mass in a time period in the range of from about 2 hours to about 12 hours. For example, embodiments of the set-delayed cement compositions may set to form a hardened mass in a time period ranging between any of and/or including any of about 2 days, about 4 days, about 6 days, about 8 days, about 10 days, or about 12 days. After activation, the set-delayed cement composition may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. The compressive strengths may determined in accordance with API RP 10B-2, *Recommended Practice for Testing Well Cements*, First Edition, July 2005, using an UCA at 140° F. while maintained at 3000 psi.

Embodiments of the present invention may include addition of a cement set accelerator to the set-delayed cement compositions. Examples of suitable cement set accelerators include, but are not limited to, calcium chloride, triethanolamine, sodium silicate, zinc formate, calcium acetate, sodium hydroxide, sodium sulfate, and combinations thereof The cement set accelerator should be added to embodiments of the set-delayed cement composition in an amount sufficient to activate the extended settable composition to set into a hardened mass. In certain embodiments, the cement set accelerator may be added to the set-delayed cement composition in an amount in the range of about 1% to about 20% by weight of the pumice. In specific embodiments, the cement set accelerator may be present in an amount ranging between any of and/or including any of about 1%, about 5%, about 10%, about 15%, or about 20% by weight of the pumice. One of ordinary skill in the art, with the benefit of this disclosure, will recognize the appropriate amount of the cement set accelerator to include for a chosen application.

As will be appreciated by those of ordinary skill in the art, embodiments of the set-delayed cement compositions of the present invention may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a well bore drilled into the subterranean formation, into a near well bore region surrounding the well bore, or into both. Embodiments of the present invention may further include activation of the set-delayed cement composition. The activation of the set-delayed cement composition may comprise, for example, addition of a cement set accelerator to the set-delayed cement composition.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 clays, or longer. In some embodiments, the set-delayed cement composition may remain in storage for a time period in a range of from about 1 day to about 7 days or longer. Thereafter, the set-delayed cement composition may be activated, for example, by addition of a cement set accelerator, introduced into a subterranean formation, and allowed to set therein.

In primary cementing embodiments, for example, embodiments of the set-delayed cement composition may be introduced into a space between a wall of a well bore and a conduit (e.g., pipe strings, liners) located in the well bore, the well bore penetrating the subterranean formation. The set-delayed cement composition may be allowed to set to form an annular sheath of hardened cement in the space between the well bore wall and the conduit. Among other things, the set cement composition may form a barrier, preventing the migration of fluids in the well bore. The set cement composition also may, for example, support the conduit in the well bore.

In remedial cementing embodiments, a set-delayed cement composition may be used, for example, in squeeze-cementing operations or in the placement of cement plugs. By way of example, the set-delayed composition may be placed in a well bore to plug an opening, such as a void or crack, in the formation, in a gravel pack, in the conduit, in the cement sheath, and/or a microannulus between the cement sheath and the conduit.

To facilitate a better understanding of the present invention, the following examples of certain aspects of some embodiments are given. In no way should the following examples be read to limit, or define, the entire scope of the invention.

EXAMPLE 1

The following series of tests was performed to evaluate the force resistance properties of comparative cement compositions comprising pumice and hydrated lime. Three different comparative sample settable compositions, designated Samples 1-3, were prepared using pumice (DS-325 lightweight aggregate), hydrated lime, Liquiment® 514L dispersant, and water, as indicated in the table below. After preparation, the samples were placed in an UCA and cured at 140° F. and 3,000 psi for 24 hours. The cured cement was then removed from the UCA and crushed to yield the compressive strength values provided in Table 1 below.

TABLE 1

Compressive Strength Tests

| Sample | | 1 | 2 | 3 |
|---|---|---|---|---|
| Density | lb/gal | 14.3 | 14.3 | 14.3 |
| Pumice:Lime Wt Ratio | | 3:1 | 4:1 | 5:1 |
| Pumice | g | 400 | 400 | 400 |
| Lime | g | 134 | 103 | 100 |
| Dispersant | g | 12 | 4 | 13 |
| Water | g | 196 | 187 | 220 |
| 24-Hr Crush Strength | psi | 2,240 | 1,960 | 2,130 |

Example 1 thus indicates that cement compositions that comprise pumice and lime in a weight ratio ranging from 3:1 to 5:1 may develop compressive strengths suitable for particular applications.

EXAMPLE 2

A sample set-delayed cement composition, designated Sample 4, having a density of 13.3 lb/gal was prepared that comprised 500 grams of pumice (DS-325 lightweight aggregate), 100 grams of hydrated lime, 13 grams of Liquiment® 514L dispersant, 24 grams of Micro Matrix® cement retarder, and 300 grams of water. The rheological properties of the sample were measured after storing at room temperature and pressure for periods of 1 day and 6 days. After preparation, the rheological properties of the sample were determined at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 2

Viscosity Tests

| Age of Sample | Fann Readings | | | | | | Yield Point | Plastic Viscosity |
|---|---|---|---|---|---|---|---|---|
| (days) | 600 | 300 | 200 | 100 | 6 | 3 | (lb/100 ft$^2$) | (centipoise) |
| 1 | 560 | 322 | 244 | 170 | 46 | 38 | 84 | 238 |
| 6 | 498 | 310 | 228 | 136 | 24 | 20 | 122 | 188 |

Example 2 thus indicates that set-delayed cement compositions that comprise pumice, hydrated lime, a dispersant, a set retarder, and water can remain fluid after 6 days.

EXAMPLE 3

A sample set-delayed cement composition, designated Sample 5, having a density of 13.4 lb/gal was prepared that comprised 500 grams of pumice (DS-325 lightweight aggregate), 100 grams of hydrated lime, 7 grams of Liquimene 514L dispersant, 6.3 grams of Micro Matrix® cement retarder, and 304 grams of water. The rheological properties of the sample were measured after storing at room temperature and pressure for periods of from 1 day to 19 days. The rheological properties were measured at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 3

Viscosity Tests

| Age of Sample | Fann Readings | | | | |
|---|---|---|---|---|---|
| (Days) | 300 | 200 | 100 | 6 | 3 |
| 1 | 462 | 300 | 130 | 12 | 8 |
| 2 | 458 | 282 | 122 | 6 | 4 |
| 5 | 420 | 260 | 106 | 3 | 2 |
| 8 | 446 | 270 | 110 | 4 | 1 |
| 12 | 420 | 252 | 100 | 3 | 2 |
| 19 | 426 | 248 | 94 | 2 | 1 |

After 7 days, calcium chloride in the amount indicated in Table 4 below was added to a separately prepared sample of the same formulation as above. The sample was then placed in an UCA and the initial setting time, which is the time for the composition to reach a compressive strength of 50 psi while maintained at 3,000 psi was determined in accordance with API RP Practice 10B-2, *Recommended Practice for Testing Well Cements*. The initial setting time of the sample was also determined without addition of the calcium chloride. The samples with and without the calcium chloride were heated to a temperature of 140° F. in 30 minutes and then maintained at that temperature throughout the test.

TABLE 4

Compressive Strength Tests

| Age of Sample (Days) | Test Temperature (° F.) | CaCl$_2$ (% by wt of Pumice & Lime) | Initial Setting Time (hr:min) |
|---|---|---|---|
| 7 | 140 | 0 | no set after 4 days |
| 7 | 140 | 10 | 5:11 |

Example 3 thus indicates that the set-delayed cement compositions that comprise pumice, hydrated lime, a dispersant, a set retarder, and water will not set for a period of at least 19 days at ambient temperature and over 4 days at 140° F. Example 3 further indicates that sample set-delayed cement compositions may be activated at a desired time by addition of a suitable activator.

EXAMPLE 4

A sample set-delayed cement composition, designated Sample 6, having a density of 13.4 lb/gal was prepared that comprised pumice (DS-325 lightweight aggregate), 20% hydrated lime, 1.4% Liquiment® 514L dispersant, 1.26% Micro Matrix® cement retarder, and 62% of water (all by weight of pumice, referred to in the table below as "% bwop"). After 45 days in storage at ambient conditions, the sample was mixed with 6% calcium chloride. At 140° F., the sample had a thickening time (time to 70 BC) of 2 hours and 36 minutes and an initial setting time (time to 50 psi) of 9 hours and 6 minutes as measured using an UCA while maintained at 3000 psi. After 48 hours, the sample was crushed with a mechanical press which gave a compressive strength of 2,240 psi. The thickening time and initial setting time were both determined in accordance with API RP Practice 10B-2, *Recommended Practice for Testing Well Cements*. The results of this test are set forth in the table below.

TABLE 5

| Age of Sample (Days) | Test Temperature (° F.) | Calcium Chloride (% bwop) | Thickening Time (hr:min) | Initial Setting Time (hr:min) | 48 Hr Crush Strength (psi) |
|---|---|---|---|---|---|
| 45 | 140 | 6 | 2:36 | 9:36 | 2,240 |

Example 4 thus indicates that the set-delayed cement compositions that comprise pumice, hydrated lime, a dispersant, a set retarder, and water will not set for a period of at least 45 days at ambient temperature. Example 4 further indicates that sample set-delayed cement compositions may be activated at a desired time by addition of a suitable activator.

EXAMPLE 5

This example was performed to evaluate the ability of sodium hydroxide and sodium sulfate to activate a set-delayed cement composition that comprised pumice (DS-325 lightweight aggregate), hydrated lime, Liquiment® 514L dispersant, Micro Matrix® cement retarder, and water. Four sample set-delayed cement compositions, designated Samples 7-10, were prepared having concentrations of components as indicated in the table below. The samples were monitored via an UCA. After the samples were placed in the UCA, the pressure was increased to 3,000 psi, and the temperature was increased to 100° F. over a 15-minute time period and held for the duration of the test. A portion of the slurry was retained and poured into a plastic cylinder to monitor the slurry behavior at room temperature and pressure. These procedures were repeated for all samples.

Sample 7 was monitored for 72 hours over which time no strength was developed and the slurry was still pourable when removed from the UCA. The portion kept at room temperature and pressure was likewise still pourable after 72 hours.

Sample 8 was prepared using the same slurry design as Sample 7 except that sodium hydroxide was added as an activator. The sodium hydroxide was added in solid form directly to the mixing jar that contained the prepared sample. As can be seen from Table 6, Sample 8, reached 50 psi of compressive strength at 16 hours and 36 minutes. The strength continued to build, reaching a maximum of 1,300 psi, when the test was stopped at 72 hours. The cured cement was removed from the UCA and crushed with a mechanical press which gave a compressive strength of 969 psi. The portion kept at room temperature and pressure was crushed after 7 days resulting in a compressive strength of 143 psi.

Sample 9 was prepared using the same slurry design as Sample 8 except that sodium sulfate was added as an activator. The sodium sulfate was added in solid form directly to the mixing jar that contained the prepared slurry. Sample 9 reached 50 psi of compressive strength at 67 hours and 29 minutes. The strength continued to build, slowly, reaching a maximum of 78 psi, when the test was stopped at 72 hours. The cured cement was removed from the UCA and crushed with a mechanical press which gave a compressive strength of 68.9 psi. The portion kept at room temperature and pressure was still too soft to be crushed after 7 days.

Sample 10 was prepared using the same slurry design as Sample 8 except that equal amounts of sodium hydroxide and sodium sulfate were added as an activator. The sodium hydroxide and sodium sulfate were added in solid form directly to the mixing jar that contained the prepared slurry. Sample 10 reached 50 psi of compressive strength at 22 hours and 40 minutes. The strength continued to build, reaching a maximum of 900 psi, when the test was stopped at 72 hours. The cured cement was removed from the UCA and crushed with a mechanical press which gave a compressive strength of 786 psi. The portion kept at room temperature and pressure was crushed after 7 days resulting in a compressive strength of 47.9 psi.

The results of these tests are set forth in the table below. The abbreviation "% bwop" refers to the percent of the component by weight of the pumice. The abbreviation "gal/sk" refers to gallons of the component per 46-pound sack of the pumice. The abbreviation "RTP" refers to room temperature and pressure.

TABLE 6

| Sample | | 7 | 8 | 9 | 10 |
|---|---|---|---|---|---|
| Density | lb/gal | 13.38 | 13.38 | 13.38 | 13.38 |
| Water | % bwop | 61.97 | 63.60 | 64.62 | 64.11 |
| Pumice | % bwop | 100 | 100 | 100 | 100 |
| Hydrated Lime | % bwop | 20 | 20 | 20 | 20 |
| Dispersant | gal/sk | 0.07 | 0.07 | 0.07 | 0.07 |
| Set Retarder | % bwop | 0.06 | 0.06 | 0.06 | 0.06 |
| Sodium Hydroxide | % bwop | — | 4 | — | 2 |
| Sodium Sulfate | % bwop | — | — | 4 | 2 |
| UCA | | | | | |
| Temp/Press | F./Psi | 100/3000 | 100/3000 | 100/3000 | 100/3000 |
| Initial Set (50 psi) | hr:min | >78 | 16:36 | 67:29 | 22:40 |
| Final Set (100 psi) | hr:min | — | 21:08 | — | 32:44 |
| 24 Hr Comp. Strength | psi | — | 138.74 | — | 59.60 |
| 48 Hr Comp. Strength | psi | — | 711.35 | — | 331.48 |
| 72 Hr Comp. Strength | psi | — | 1300 | 78 | 900 |
| 72 Hr Crush Strength (UCA) | psi | — | 969 | 68.90 | 786 |
| 7-Day Crush Strength (RTP) | psi | — | 143.20 | 0.00 | 47.90 |

Example 5 thus indicates that sodium hydroxide, sodium sulfate, and combinations of the two can activate the set-delayed cement compositions, but to varying degrees. The testing showed that both sodium hydroxide and combinations of sodium hydroxide with sodium sulfate activated the cement compositions to an acceptable level. When compared to the non-activated composition, sodium sulfate activated the cement compositions, but much less so than the sodium hydroxide or combination of sodium hydroxide and sodium sulfate.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may b,e combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be Understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation, comprising:
   providing a set-delayed cement composition comprising water, pumice, hydrated lime, a dispersant, and a set retarder; wherein the set retarder comprises a phosphonic acid derivative and the dispersant comprises a polycarboxylated ether dispersant;
   activating the set-delayed cement composition;
   introducing the set-delayed cement composition into a subterranean formation; and
   allowing the set-delayed cement composition to set in the subterranean formation.

2. The method of claim 1 wherein the pumice has a mean particle size in a range of about 1 micron to about 200 microns.

3. The method of claim 1 wherein the pumice and the hydrated lime are present in a weight ratio of pumice to hydrated lime of about 10:1 to about 1:1.

4. The method of claim 1 wherein the set-delayed cement composition comprises a pumice-to-hydrated-lime weight ratio of about 3:1 to about 5:1, wherein the set retarder is present in an amount of about 0.01% to about 2% by weight of the pumice, and wherein the polycarboxylated ether dispersant is present in an amount of about 0.01% to about 2% by weight of the pumice.

5. The method of claim 1 wherein the set-delayed cement composition further comprises at least one additive selected from the group consisting of a weighting agent, a lightweight additive, a gas-generating additive, a mechanical-property-enhancing additive, a lost-circulation material, a filtration-control additive, a fluid-loss-control additive, a defoaming agent, a foaming agent, a thixotropic additive, and any combination thereof.

6. The method of claim 1 wherein the set-delayed cement composition remains in a pumpable fluid state for a time period of at least about 7 days prior to the activating.

7. The method of claim 1 wherein the set-delayed cement composition remains in a pumpable fluid state for a time period of at least about 30 days prior to the activating.

8. The method of claim 1 wherein the activating comprises adding a cement set accelerator to the set-delayed cement composition.

9. The method of claim 1 wherein the set-delayed cement composition sets to develop a 24-hour compressive strength of at least about 50 psi as measured using an Ultrasonic Cement Analyzer at 140° F. while maintained at 3,000 psi.

10. The method of claim 1 wherein the set-delayed cement composition is introduced into a well bore penetrating the subterranean formation, the well bore having a bottom-hole static temperature of less than about 200° F.

11. The method of claim 1 wherein the set-delayed cement composition is introduced into an annulus between a wall of a well bore and a conduit disposed in the well bore.

12. A method of cementing in a subterranean formation, comprising:
    providing a set-delayed cement composition comprising water, pumice, hydrated lime, a dispersant, and a set retarder; wherein the set retarder comprises a phosphonic acid derivative and the dispersant comprises a polycarboxylated ether dispersant;
    storing the set-delayed cement composition for a period of at least about 1 day;
    adding a cement set accelerator to the set-delayed cement composition;
    introducing the set-delayed cement composition into a subterranean formation; and
    allowing the set-delayed cement composition to set in the subterranean formation.

13. The method of claim 12 wherein the pumice and the hydrated lime are present in a weight ratio of pumice to hydrated lime of about 10:1 to about 1:1.

14. The method of claim 12 wherein the set-delayed cement composition is stored for a time period of at least about 30 days.

15. The method of claim 12 wherein the pumice has a mean particle size in a range of about 1 micron to about 200 microns.

16. The method of claim 12 wherein the set-delayed cement composition comprises a pumice-to-hydrated-lime weight ratio of about 3:1 to about 5:1, wherein the set retarder is present in an amount of about 0.01% to about 2% by weight of the pumice, and wherein the polycarboxylated ether dispersant is present in an amount of about 0.01% to about 2% by weight of the pumice.

17. The method of claim 12 wherein the set-delayed cement composition remains is stored for a time period of at least about 7 days.

18. The method of claim 12 wherein the set-delayed cement composition is introduced into a well bore penetrating the subterranean formation, the well bore having a bottom-hole static temperature of about 200° F. or less.

19. The method of claim 12 wherein the set-delayed cement composition is introduced into an annulus between a wall of a well bore and a conduit disposed in the well bore.

20. A method of cementing in a subterranean formation, comprising:
   providing a cement composition comprising water, pumice, hydrated lime, a dispersant, and a set retarder, wherein the set retarder comprises a phosphonic acid derivative and the dispersant comprises a polycarboxylated ether dispersant, wherein the water is present in an amount of about 33% to about 200% by weight of the pumice, wherein the hydrated lime is present in an amount of about 10% to about 100% by weight of the pumice;
   storing the cement composition in a pumpable fluid state for a period of about 1 day or longer;
   activating the cement composition;
   introducing the cement composition into a space between a wellbore wall and a subterranean formation; and
   allowing the cement composition to set in the space.

21. The method of claim 20 wherein the cement composition is stored for a period of about 7 days or longer.

* * * * *